United States Patent
Garcia-Diaz et al.

(10) Patent No.: US 10,450,660 B2
(45) Date of Patent: Oct. 22, 2019

(54) RECOVERY OF TRITIUM FROM MOLTEN LITHIUM BLANKET

(71) Applicant: Savannah River Nuclear Solutions, LLC, Aiken, SC (US)

(72) Inventors: Brenda L. Garcia-Diaz, Aiken, SC (US); David W. Babineau, Aiken, SC (US); Hector R. Colon-Mercado, Aiken, SC (US); Joseph A. Teprovich, Aiken, SC (US); Luke C. Olson, North Augusta, SC (US); Roderick E. Fuentes, Aiken, SC (US)

(73) Assignee: Savannah River Nuclear Solutions, LLC, Aiken, SC (US)

(*) Notice: Subject to any disclaimer, the term of this patent is extended or adjusted under 35 U.S.C. 154(b) by 500 days.

(21) Appl. No.: 14/931,018

(22) Filed: Nov. 3, 2015

(65) Prior Publication Data

US 2016/0122881 A1  May 5, 2016

Related U.S. Application Data

(60) Provisional application No. 62/074,960, filed on Nov. 4, 2014.

(51) Int. Cl.
*C25B 1/02* (2006.01)
*C25B 9/06* (2006.01)
(Continued)

(52) U.S. Cl.
CPC .......... *C25B 1/02* (2013.01); *C01B 6/04* (2013.01); *C25B 9/06* (2013.01); *C25B 9/142* (2013.01);
(Continued)

(58) Field of Classification Search
CPC ..................................................... C25B 1/02
See application file for complete search history.

(56) References Cited

U.S. PATENT DOCUMENTS 3,957,597 A  5/1976  Maroni
4,178,350 A * 12/1979 Collins ............... B01D 53/46
376/301

(Continued)

FOREIGN PATENT DOCUMENTS

JP  2002-080987 A * 3/2002 ............... C25C 3/02
WO  WO9013127  11/1990
(Continued)

OTHER PUBLICATIONS

"Tritium Facts and Inforamation", Pennsylvania Department of Environmental Protection, date verified for May 2013 via the WebArchive at http://web.archive.org/web/20130515162757/http://www.dep.state.pa.us/brp/Radiation_Control_Division/Tritium.htm (Year: 2013).*

(Continued)

*Primary Examiner* — Harry D Wilkins, III
(74) *Attorney, Agent, or Firm* — Dority & Manning, PA

(57) ABSTRACT

Electrochemical cells and methods are described that can be utilized for the recovery of tritium directly from a molten lithium metal solution without the need for a separation or concentration step prior to the electrolytic recovery process. The methods and systems utilize an ion conducting electrolyte that conducts either lithium ion or tritide ion across the electrochemical cell.

18 Claims, 4 Drawing Sheets

(51) Int. Cl.
    *C25B 9/18*     (2006.01)
    *C25B 13/04*     (2006.01)
    *G21B 1/11*     (2006.01)
    *G21F 9/06*     (2006.01)
    *C01B 6/04*     (2006.01)
    *C25B 9/14*     (2006.01)

(52) U.S. Cl.
    CPC ............... *C25B 9/18* (2013.01); *C25B 13/04* (2013.01); *G21B 1/115* (2013.01); *G21F 9/06* (2013.01)

(56) References Cited

U.S. PATENT DOCUMENTS

| | | | | |
|---|---|---|---|---|
| 4,235,863 | A * | 11/1980 | Schulten | C25B 1/02 204/253 |
| 5,399,246 | A * | 3/1995 | Joshi | B01D 53/326 205/765 |
| 5,578,189 | A * | 11/1996 | Joshi | B01D 53/326 205/341 |
| 6,287,448 | B1 * | 9/2001 | Schierle-Arndt | C25C 1/02 204/220 |
| 9,797,053 | B2 * | 10/2017 | Joshi | C25B 13/04 |
| 2004/0118700 | A1 | 6/2004 | Schierle-Arndt et al. | |
| 2005/0100793 | A1 * | 5/2005 | Jonghe | C25C 1/02 429/246 |
| 2006/0102489 | A1 * | 5/2006 | Kelly | C25B 1/00 205/357 |
| 2012/0006690 | A1 * | 1/2012 | Amendola | C25C 1/02 205/366 |
| 2013/0118913 | A1 * | 5/2013 | Vajo | C25B 1/02 205/639 |
| 2014/0138257 | A1 | 5/2014 | Kramer et al. | |
| 2015/0014184 | A1 * | 1/2015 | Swonger | C25C 1/02 205/560 |
| 2015/0083606 | A1 | 3/2015 | Mosby et al. | |
| 2016/0111717 | A1 * | 4/2016 | Weitelmann | H01M 4/0447 252/182.1 |

FOREIGN PATENT DOCUMENTS

| | | |
|---|---|---|
| WO | WO9202020 | 2/1992 |
| WO | WO9606434 | 2/1996 |
| WO | WO2013166505 | 11/2013 |
| WO | WO2013166506 | 11/2013 |

OTHER PUBLICATIONS

Thangadurai et al, Novel Fast Lithium Ion Conduction in Garnet-Type Li5La3M2O12 (M=Nb, Ta), Journal of American Ceramic Society, vol. 86, No. 3, 2003 (no month available), pp. 437-440 (Year: 2003).*
Gibb et al, A Survey Report on Lithium Hydride, United States Atomic Energy Commision NYO-3957, May 1954, pp. i-iv and 1-36 (available at https://www.osti.gov/servlets/purl/4393297, accessed on Oct. 29, 2018) (Year: 1954).*
Peters, Kurt, Uber eine Bestatingung de Faradayschen Gesetzes und Lithiumhydrid, Zeitschrift fur anorganische und allgemeine Chemie, vol. 131, No. 1, Nov. 1923, pp. 140-172 (Year: 1923).*
Savannah River Nuclear Solutions, LLC; International Patent Application No. PCT/US15/058763; International Preliminary Report on Patentability, dated Aug. 30, 2016; (13 pages).
Buxbauma; "The Use of Zirconium-Palladium Windows for the Separation of Tritium from the Liquid Metal Breeder-Blanket of a Fusion Reactor," *Separation Science and Technology* (1983) 18 (12-13), pp. 1251-1273
Calaway; "Electrochemical Extraction of Hydrogen from Molten LiF—LiCl—LiBr and Its Application to Liquid-Lithium Fusion Reactor Blanket Processing," *Nuclear Technology* (1987) 39 (1), pp. 63-74.
Farmer et al.; "Alternative to the Maroni Process for Tritium Recovery in Fusion Reactors: Avoiding Volatile Hydrogen Fluoride and High-Temperature High-Speed Rotating Machinery," Lawrence Livermore National Laboratory (2013) (30 pages).
Moriyama et al.; "Study on Tritium Recovery from Breeder Materials," *Kyoto University*; Jul. 2014; (7 pages).
Moriyama, eta l.; "Molten salts in fusion nuclear technology," *Fusion Engineering and Design*, (1998) 39-40, pp. 627-637.
Sze, et al.; "Combined Gettering and Molten salt Process for Tritium Recovery from Lithium," presentation at *Intl. Symposium on Fusion Nuclear Technology* (ISFNT) Apr. 10-19, 1988, Tokyo, Japan (23 pages).
Matsuo, M., eta l.; "Complex hydrides: a new category of solid-state lithium fast ion conductors," (Nov. 29, 2011; p. 1; retrieved from the internet: http://www.sigmaaldrich.com/technical-documents/articles/material-matters/complex-hydrides.html.
Savannah River Nuclear Solutions, LLC; International Patent Application No. PCT/US15/58763; International Search Report, dated Jan. 12, 2016; (2 pages).
Weinberger, et al. "Electrolysis of Lithium Hydride," *Canadian Journal of Chemistry*, 36(11), (1958), pp. 1455-1460.
EPO Extended European Search Report, dated Jan. 5, 2018.

* cited by examiner

RECOVERY OF TRITIUM FROM MOLTEN LITHIUM BLANKET

CROSS REFERENCE TO RELATED APPLICATION

This application claims filing benefit of U.S. Provisional Patent Application Ser. No. 62/074,960, confirmation no. 2535, having filing date of Nov. 4, 2014, which is incorporated herein by reference in its entirety.

FEDERAL RESEARCH STATEMENT

This invention was made with Government support under Contract No. DE-AC09-08SR22470 awarded by the United States Department of Energy. The Government has certain rights in the invention.

This application and technology are controlled pursuant to ECCN 1E001.

BACKGROUND OF THE INVENTION

The lithium blanket surrounding the core of neutron generating devices such as fusion and advanced fission reactors can advantageously be utilized for both heat transfer and production of tritium. Tritium already proves useful in applications such as lighting and weapons production, and is expected to be the primary fuel source for fusion reactors in deuterium/tritium (D/T) fueled power plants.

The formation of tritium occurs upon exposure of the molten lithium metal of the blanket to the neutron flux of a conventional fission reactor utilizing, for instance, $U^{233}$, $U^{235}$, or $Pu^{239}$, upon which exposure lithium tritide (LiT) will form in the blanket with the tritium bred by neutron reaction with lithium atoms. A single lithium-6 atom exposed to the thermal neutron flux can fission to produce a tritium nucleus and a helium nucleus. Lithium-7 can likewise be used as it will fission on capturing a fast neutron to produce a tritium nucleus, an □-particle and a neutron, though lithium-7 has a considerably smaller cross section for low-energy neutron flux than Ideally, since tritium is unavailable in any significant quantities in nature, a practical and efficient D/T fueled power plant will be developed in which the production and recovery of tritium from the lithium blanket can be carried out at least at the same rate as it is consumed as fuel in the energy production process.

It is generally desirable that only small amounts of tritium be allowed to build up within the lithium blanket before the recovery rate matches the breeding rate. If the excess tritium is not removed from the blanket, the rate of tritium permeation through the blanket and heat exchanger structures can increase, which can pose a radioactivity problem. Large quantities of tritium in the blanket system can also increase the radioactivity hazards during routine maintenance and emergencies associated with mechanical and structural failures. As such, methods for separation and recovery of tritium from the lithium blanket are necessary.

Various processes have been evaluated tor recovering tritium from the lithium blanket and/or coolant systems within fusion reactors. Methods have included gettering, permeation, fractional distillation, cold trapping, and liquid extraction followed by electrolysis. The latter has been the most popular for development, in which a molten salt extraction of the LiT is carried out followed by electrolysis in which the molten salt is utilized as the electrolyte leading to reduction of the lithium ion to form lithium metal at one electrode and oxidation of the tritide ion at the other electrode to form tritium.

Unfortunately, current extraction/electrolysis processes require high speed and high temperature centrifugal separators, which are expensive and complicated to operate. In addition, the materials involved in the extraction process can be highly corrosive, which adds costs as well as safety issues. Moreover, salts used in the liquid/liquid extraction can solubilize into the blanket solution, which can have an impact on tritium breeding due to neutron interaction with the salts.

In view of such issues, what are needed in the art are methods and systems for safe and effective recovery of tritium from the molten lithium metal blanket that can prove to be more economical and straight forward as compared to previously known methods so as to reduce both capital costs and operating expenses.

SUMMARY

Electrolysis-based methods and systems for use in tritium recovery are described that do not require a separation process for removal of the lithium tritide (LiT) from the molten lithium metal prior to the electrolysis.

A method can include conveying a solution that includes the LiT in the molten lithium metal to an electrochemical cell. The electrochemical cell includes an electrolyte and an electrode. In one embodiment, the electrolyte can conduct lithium ions. In another embodiment, the electrolyte can conduct tritide ions, in either case, the cell is arranged such that the electrolyte physically separates the electrode from the solution that includes the LiT in the molten lithium metal.

The method can also include establishing a voltage potential across the electrolyte and between the solution and the electrode. The voltage potential will be suitable to ionize the LiT and, depending upon the specific characteristics of the system, form either lithium metal and tritide ion or alternatively form lithium ions and tritium.

For example, in one embodiment, the molten lithium metal of the solution can function as a second electrode (in this embodiment as an anode), and upon establishment of the voltage potential the LiT can ionize to form lithium ions and tritium gas. The lithium ion can then be conducted across the electrolyte to the electrode, where it can be reduced to form lithium metal.

In another embodiment, the voltage potential can drive the formation of tritide ion and lithium at a first electrode, and the tritide ion can then be conducted across the electrolyte to the second electrode, wherein it can be oxidized to form tritium gas.

In either case, the method and system can be utilized to convert LiT of the blanket to form lithium metal that can be recycled back to the blanket and tritium gas that can be collected for use as desired. Beneficially, the method can be carried out without the necessity of any pre-electrolysis separation methods.

These and other features, aspects and advantages of the present disclosure will become better understood with reference to the following description and appended claims.

BRIEF DESCRIPTION OF THE DRAWINGS

A full and enabling disclosure of the present invention, including the best mode thereof, directed to one of ordinary skill in the art, is set forth in the specification, which makes reference to the appended figure, which.

DETAILED DESCRIPTION OF THE INVENTION

It is to be understood by one of ordinary skill in the art that the present discussion is a description of exemplary embodiments only, and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to an electrochemical cell and methods of using the electrochemical cell. More specifically, the electrochemical cell and methods can be utilized for the recovery of tritium directly from a molten lithium metal solution without the need for a separation or concentration step prior to the electrolytic recovery process. The methods and systems provide a more economical route to regeneration of lithium metal and production of useful tritium gas by use of an ion conducting electrolyte that conducts either lithium ion or tritide ion across the electrochemical cell. The methods and systems are simplified and less expensive as compared to previously known methods, which can improve the commercialization economics of fusion energy processes.

Figure 1:
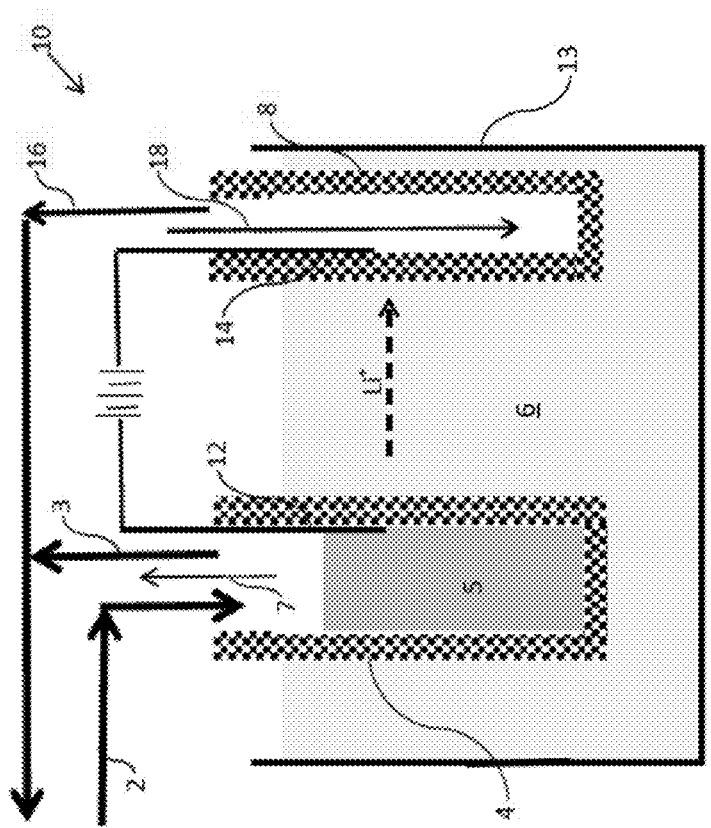
FIG. 1 schematically illustrates one embodiment of a electrochemical cell as described herein.

One embodiment of an electrochemical cell as may be utilized in the process is illustrated in FIG. 1. As can be seen, the cell 10 can include an inlet 2 for a solution that includes LiT in molten lithium metal. The LiT can be formed in a lithium blanket that has been exposed to neutron flux from a reactor core, as discussed above. The solution can be pulled off of the blanket and conveyed to the cell 10 directly or alternatively can be first cooled or heated. When cooled, the coolant can be liquid (e.g., molten metals such as sodium or potassium) or gaseous (e.g., helium, sodium vapor, etc.) as is known in the art, and the heat pulled off of the solution can be used in power generation, for instance via steam generation or by direct use of a gaseous coolant in a turbine system.

In any case, the solution delivered via inlet 2 can include the LiT in the molten lithium metal and as such can be at a temperature that is greater than the melting temperature of lithium, e.g., about 200° C. or greater at atmospheric pressure, for instance from about 250° C. to about 900° C. or from about 300° C. to about 400° C., in some embodiments.

In this embodiment, the molten lithium metal of the solution can act as an electrode in the system, and specifically as an anode, and the solution can be held in the cell such that it is subjected to the voltage potential that is placed across the cell during processing. For instance, in the illustrated embodiment, the solution 5 can be conveyed to a supporting container 4, within which the solution 5 can be subjected to the voltage potential placed across the cell. In addition, the supporting container 4 can provide access to the electrolyte for the ions formed from the LiT upon the establishment of the voltage potential.

The supporting container 4 can be formed of a material that can be capable of use while held in the electrolyte 6. In one embodiment the material forming the supporting container 4 can include a porous material such as a ceramic that is capable of conducting the lithium ions formed in the lithium oxidation reaction. For example, the supporting container 4 can include a non-conductive material in conjunction with a lithium ion conductive material. For instance, the supporting container 4 can be formed of a lithium intercalation compound such as lithium nickel oxide, lithium titanate, lithium cobalt oxide, lithium manganese oxide, or a mixed compound of these active components such as lithium nickel cobalt manganese oxide ($LiNi_xCo_yMn_zO_2$) or other suitable material.

The supporting container 4 can be porous such that during use the formed lithium ions can pass through the porous matrix material. In one embodiment, the supporting container 4 can include powders of different sizes, for instance a portion of the supporting container 4 can be thrilled of a coarse powder and a portion of the supporting container can be formed of a finer powder such that pores of the supporting container 4 can have variable cross-sectional areas. In addition, the powders used to form the supporting container 4 can vary, for instance with regard to lithium ion conductivity. This can facilitate conveyance of the lithium ions across the supporting container 4.

In the embodiment of FIG. 1, upon establishment of the voltage potential, the lithium oxidation reaction at the molten lithium metal solution 5 that acts as an electrode can be as follows:

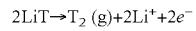

The lithium ions formed in the reaction can then be conveyed across the electrolyte 6 that is a lithium ion conducting electrolyte. For instance, the electrolyte can be a lithium based electrolyte such as a garnet-type electrolyte, e.g., lithium lanthanum titanates ($Li_xLa_yTi_zO_n$), lithium lanthanum tantalums ($Li_xLa_yTa_zO_n$), lithium lanthanum zirconates ($Li_xLa_yZr_zO_n$), etc., an organic lithium-based electrolyte that can withstand the operating conditions of the cell 10 (e.g., lithium phthalocyanine) or similar solid-state electrolyte with high ionic conductivity.

The tritium gas formed in the lithium oxidation reaction can be collected from the supporting container 4, as at 7. For instance the formed tritium gas can be conveyed upwardly 7 through the molten lithium metal and collected.

Figure 2:
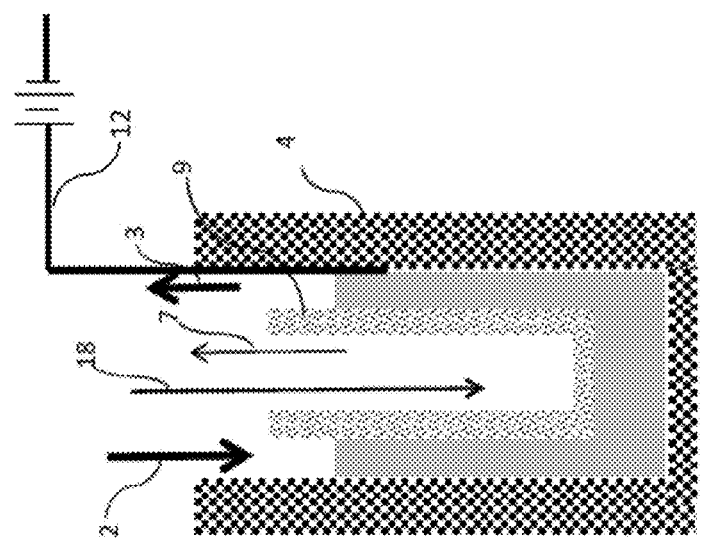
FIG. 2 schematically illustrates one embodiment of an supporting container of an electrochemical cell.

In another embodiment, illustrated in FIG. 2, which illustrates only the supporting container portion of a cell, the supporting container 4 can include an inner liner 9 that allows passage of the formed tritium gas, but prevents passage of the molten lithium metal. The tritium gas can then be collected at shown at 7 from within the inner liner 9. If desired, a carrier gas such as helium or argon can be delivered within the liner 9, as at 18 or via a manifold at the base of the liner 9. As the tritium gas is formed and passes through the liner 9, it can be entrained within the carrier gas flow and conveyed out of the cell at 7 to be collected.

Following the conversion reaction of the LiT, the molten lithium metal solution, from which the LiT has been removed, can be removed from the cell as at 3 and returned to the lithium blanket of the reactor core.

Referring again to FIG. 1, the electrochemical cell 10 also includes an electrode 8. The electrode 8 is in electrical communication with the molten lithium metal solution 5 that acts as a second electrode via current collector 12 and current collector 14 that are electrically connected to one another in conjunction with a device or system that can establish the voltage potential across the molten lithium metal solution and the electrode 8.

Examples of electrically conductive materials from which the current collectors 12, 14 can be formed include, without limitation, metallic materials based on nickel, tungsten, molybdenum, and cobalt as well as carbon based materials such as glassy carbon and graphite. Alloys including refractory metals such as niobium, molybdenum, tantalum, tungsten, and rhenium as well as conductive ceramics and composite materials can also be utilized in forming the current collectors 12, 14. For example, stainless steel may be utilized as a current collector in some embodiments.

The electrode 8, which functions as a cathode in this embodiment, can include a material that can encourage reduction of the lithium ions to form lithium.

Examples of materials from which the electrode 8 can be formed include, without limitation, metallic materials based on nickel, tungsten, molybdenum, and cobalt as well as carbon based materials such as glassy carbon and graphite. Alloys including refractory metals such as niobium, molybdenum, tantalum, tungsten, and rhenium as well as conductive ceramics and composite materials can also be utilized in forming the electrode 8. In one embodiment, the electrode 8 can include a metallic material in powder form. In this embodiment, the electrode 8 can be porous and during use the lithium ions and/or the lithium metal can pass through the porous electrode material. As discussed above with regard to the supporting container 4, the electrode 8 can include powders of different sizes.

The electrode 8 can include non-conductive materials in conjunction with an electrically conductive electrode material. For example, in one embodiment, the electrode 8 can be formed of a non-conductive material, such as non-conductive ceramic in conjunction with a conductive material.

The electrode 8 can encourage reduction of the lithium ions that are conveyed across the electrolyte to form lithium metal at the electrode 8 according to the following reaction:

Upon establishment of a voltage potential across the cell that is greater than the dissociation potential of the lithium tritide the dissociation reaction described above will begin that form lithium ions and tritium gas in the solution 5. Any method or device as is generally known in the art may be utilized to control the voltage potential across the electrodes of the electrochemical cell. In general, the voltage potential for the reaction can be about 30 volts or less. For instance from 0 V to about 30 V, from about 0.5 V to about 10 V or from about 1 V to about 5 V in some embodiments. It should be understood, however, that higher voltages can be possible in some embodiments, as the preferred voltage potential can depend on a plurality of parameters including the electrode spacing as well as the ion conductivity of the electrolyte. For instance, if the electrodes are spaced far apart, the voltage potential may be greater than about 30V.

The voltage potential can drive the lithium ions across the electrolyte 6 via the lithium ion conveying electrolyte 6. The lithium ions can then be reduced at the electrode 8 to form lithium, and can exit the cell, as at 16. As illustrated, in this embodiment, the electrode 8 can be porous to encourage passage of the lithium ions and/or the formed lithium through the electrode 8 to be collected on an inner surface of the electrode 8, with the inner surface being separated from the electrolyte. This is not a required design of the electrochemical cell 10 however, and any design that allows for collection of the formed lithium is encompassed herein. For instance, in one embodiment, the electrode can be designed such that the formed lithium can be conveyed by gravity down the electrode and out of the cell, for instance by use of an intervening non-conductive porous material or a conveying pipe or tube. Once out of the cell 10, the lithium can then be collected and cycled back to the lithium blanket.

The method utilized to remove the formed lithium from the cell 10 can be any suitable method, and is not particularly limited, though it may be preferred to remove the formed lithium prior to the pooling of the lithium, as excessive contact between the formed lithium and a larger pool of molten lithium metal can interfere with the function of the cell. In the illustrated embodiment, a sparge gas 18 such as helium or argon can be utilized to carry the lithium formed at the electrode 8 at 16. The lithium thus formed can be combined with the lithium 3 and returned to the lithium blanket.

The cell 10 can be surrounded by a liner 13 that can be formed of any suitable material that is resistant to the components of the cell. For instance, the liner 13 can be formed of a corrosion resistant material including carbon compounds such as graphite or glassy carbon, ceramics such as silicon carbide or boron nitride, a corrosion resistant metal alloy, or composite material including carbon and ceramics, or a perfluorinated plastic material, such as a polyfluoroethylene, provided the material can withstand the operating temperatures of the cell. In one embodiment, the liner 13 can be formed of a glassy carbon material. In general, any metal of the liner 13 can be insulated from the materials held within the liner 13, for instance by inclusion of an insulative covering on at least that portion of a metal or metal alloy of the liner 13 that would otherwise contact the electrolyte 6 or other contents of the cell 10.

Temperature control elements such as coils, etc. (not shown in FIG. 1) can be associated with the cell 10 to control the temperature of the electrolyte 6, as is known. The temperature of the cell during operation can be from about 150° C. to about 1000° C., or from about 150° C. to about 800° C., in one embodiment.

According to one embodiment, a tritium recovery process can be carried out in-line with existing lithium processing equipment. For instance, FIG. 3 illustrates one embodiment of a process in which the electrochemical tritium recovery process can be carried out within a lithium buffer tank (also typically referred to as a lithium reservoir, surge tank, etc.) as is commonly utilized in conjunction with a lithium blanket surrounding the core of neutron generating devices such as fusion and advanced fission reactors.

Figure 3:
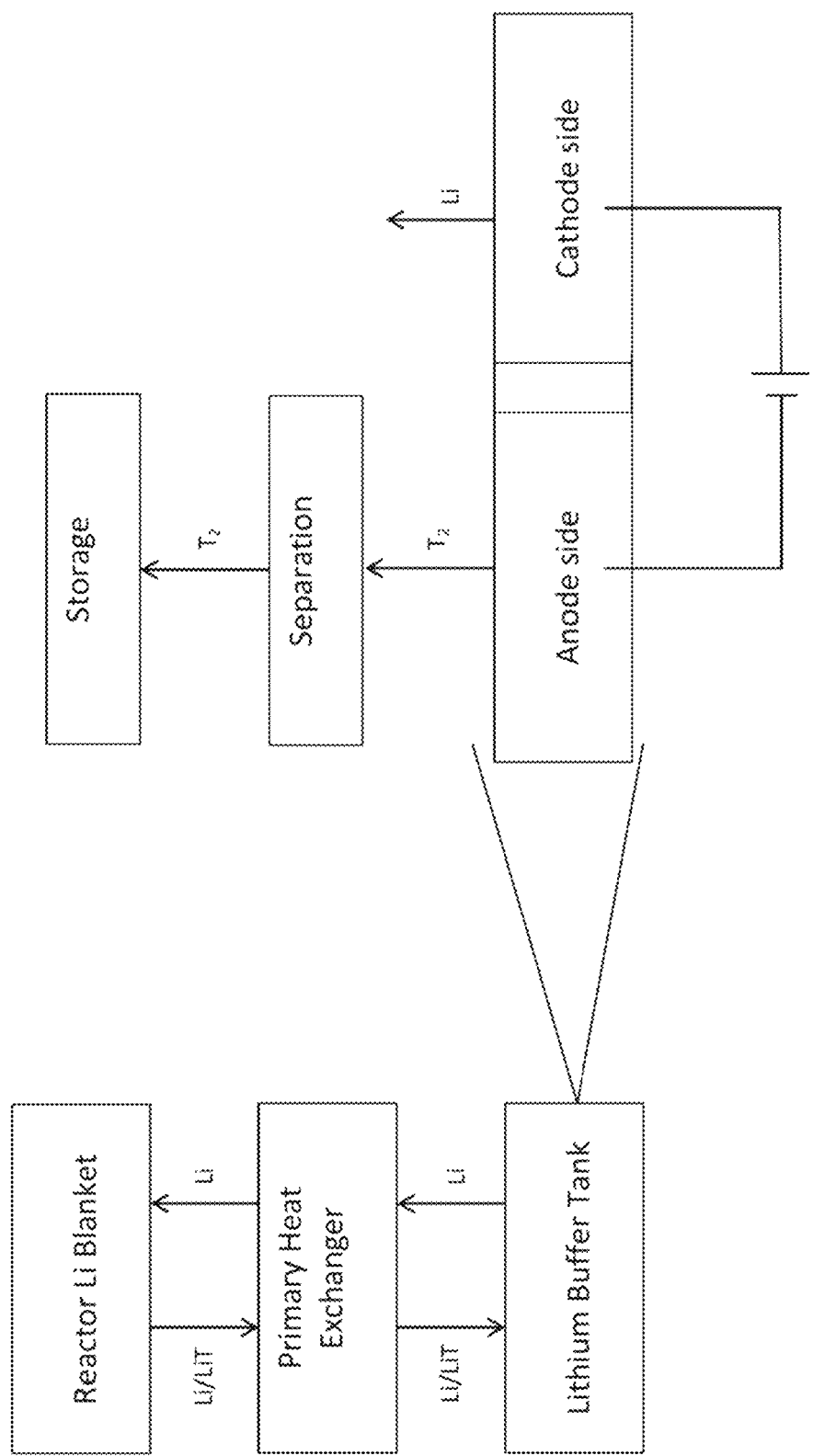
FIG. 3 presents a flow diagram for one embodiment of the disclosed process.

As illustrated in FIG. 3, molten lithium from the lithium blanket that contains an amount of lithium tritide can be pulled off of the lithium blanked. The lithium tritide being formed from tritium bred within the lithium blanket as a result of neutron bombardment from the fusion reaction. Following cooling, the lithium/lithium tritide mixture can be conveyed to a buffer tank, as is known. The tritium recovery process can then be carried out within the buffer tank through utilization of a solid electrode element that can be located within the buffer tank. As discussed above the lithium tritide can be degraded via the electrolysis reaction to form tritium gas at the anode side and lithium at the cathode side. As shown, the tritium gas can be separated and collected and lithium can be returned to the lithium blanket.

Figure 4:
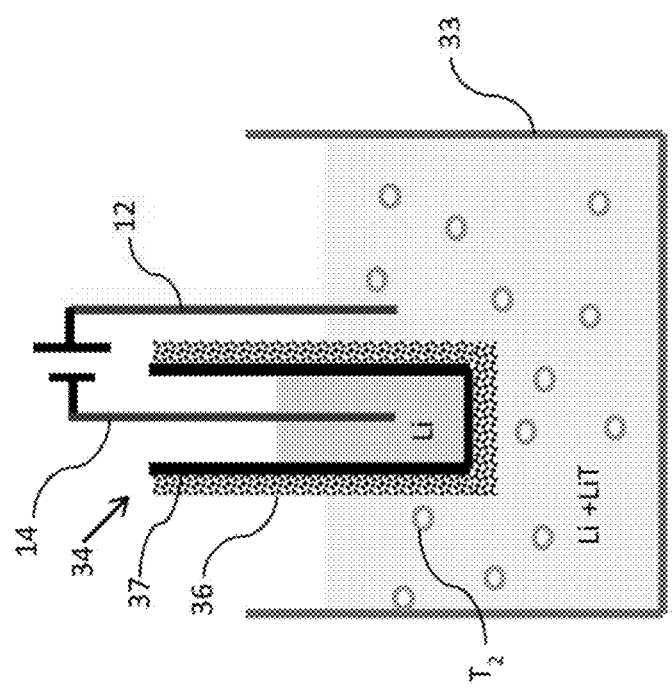
FIG. 4 schematically illustrates another embodiment of an electrochemical cell as described herein.

FIG. 4 presents a schematic representation of a buffer tank 33 for use in one such embodiment. As illustrated, the system can include an electrode element 34 capable of submersion within the molten lithium held within the buffer tank 33.

The electrode element 34 can include a solid electrolyte 36 capable of conveying lithium ions and a cathode 37 separated from the lithium of the buffer tank by the solid electrolyte 36. For instance, the cathode 37 can be located at one or more internal surfaces of the solid electrolyte 36 that can be immersed in the molten lithium within the buffer tank 33. In this embodiment, the anode for the cell can be the molten lithium contained within the buffer tank 33.

The cathode 37 can include any material that can encourage reduction of the lithium ions to form metallic lithium on the inside of the electrode element. Cathode materials can include those as discussed previously in some embodiments. The solid electrolyte 36 can be formed of any material(s) capable of transporting lithium ions and capable of submersion in the molten lithium within the buffer tank 33. By way of example, and without limitation, the solid electrolyte 36 can include a lithium ion-conductive solid composed of a sulfide glass such as $Li_2S$—$SiS_2$, $Li_2S$—$P_2S_5$, $Li_2S$—$B_2S_3$, etc. A sulfide glass can optionally be doped with a lithium halide (e.g., LiI) or a lithium oxysalt (e.g., $Li_3PO_4$). For example, a sulfide glass having an ionic conductivity of from about $10^{-4}$ to about $10^{-3}$ S/cm can be utilized in some embodiments. A sulfide glass electrolyte can be formed according to methods as are generally known in the art including, for example, by mixing a glass forming material such as $SiS_2$, $P_2S_5$, $B_2S_3$ and the like with a glass modifier $LiS_2$ and thermally melting the mixture, followed by quenching.

During use, a voltage potential can be placed across the cell through utilization of an anodic current collector 12 and cathodic current collector 14. The voltage potential can be determined according to the dissociation potential of the lithium tritide at the conditions of the buffer tank. For instance, the thermodynamic equilibrium cell potential for LiT decomposition is 0.4 V at 450° C. By way of example, in one embodiment the voltage potential can be from about 0.5 V to about 1 V, or about 0.6 V of potential in some embodiments to drive the reaction.

As the degradation of the lithium tritide proceeds within the molten lithium anode, the lithium ions can be driven across the solid electrolyte 37 to be reduced at the cathode. The tritium gas that is formed can be separated and stored as described above.

The lithium that is reduced at the cathode 37 can be recovered from the interior of the electrode element 34, for instance by pumping or pouring the lithium metal out in those embodiments in which the electrode element 34 is in the form of a container. In some embodiment, the lithium can be recovered by reversing the potential on the cell, which can lead to transport of the lithium ions back across the solid electrolyte 36 and reduction in the lithium metal of the buffer tank 33.

In general, in this embodiment, the buffer tank 33 can be electrically insulated from the environment to ensure process safety.

Figure 5:
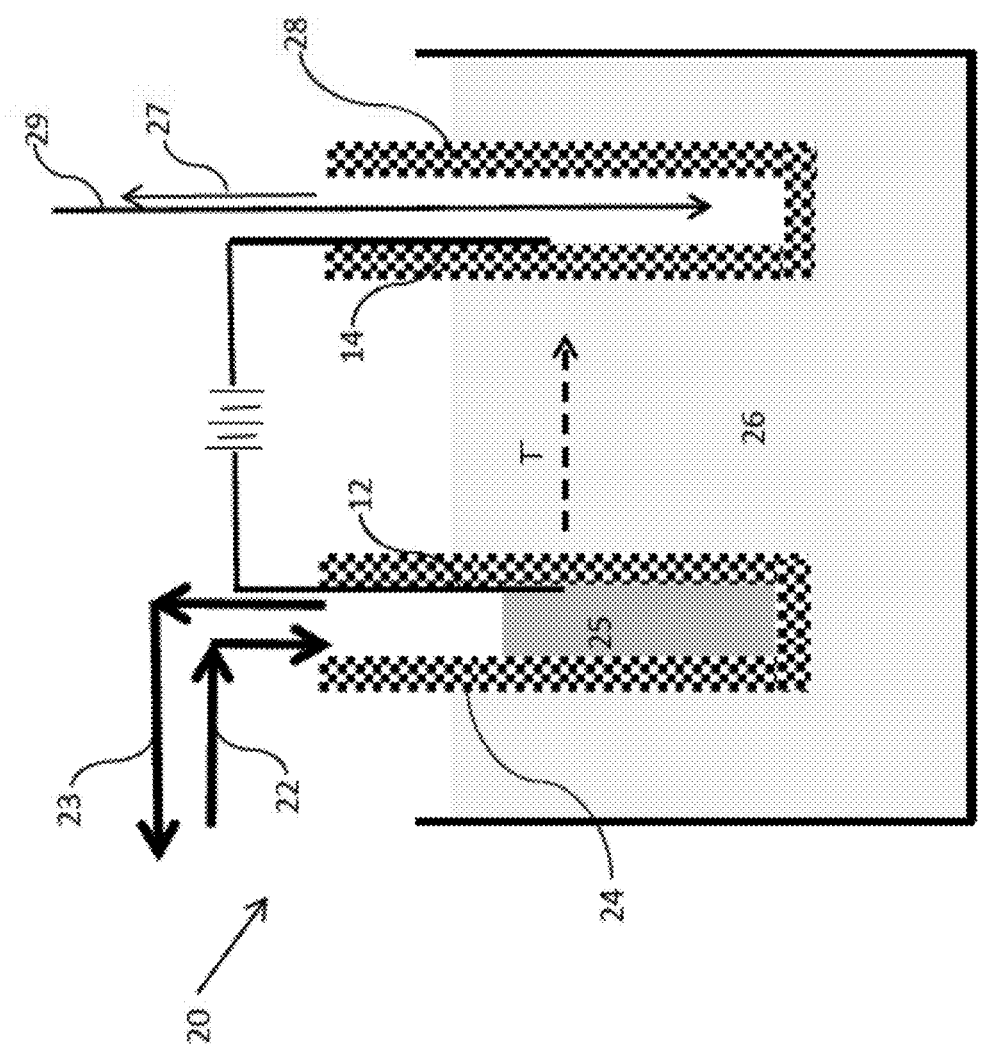
FIG. 5 schematically illustrates another embodiment of an electrochemical cell as described herein.

Another embodiment of an electrochemical cell 20 is illustrated in FIG. 5. In this embodiment, the electrolyte conducts tritide ions, rather than lithium ions. Accordingly, in this embodiment, a solution including the LiT in the molten metal lithium solution can be delivered as at 22 from the lithium blanket, optionally following cooling, as discussed above. The solution 25 can contact an electrode 24 that can be in the form of a container, as illustrated. In this embodiment, the electrode 24 can encourage a tritide ion formation according to the following reaction:

$$2LiT + 2e^- \rightarrow 2T^- + 2Li$$

Examples of materials from which the electrode 24 can be formed include cathode materials as discussed above including, without limitation, metallic materials based on nickel, tungsten, molybedenum, and cobalt as well as carbon based materials such as glassy carbon and graphite. Alloys including refractory metals such as niobium, molybdenum, tantalum, tungsten, and rhenium as well as conductive ceramics and composite materials can also be utilized in forming the electrode 24. Non-conductive materials can also be used in conjunction with an electrically conductive material, as discussed above. The electrode 24 can be porous such that the tritide ions can pass through the porous electrode 24. As discussed above, a porous electrode 24 can include powders of different sizes.

The lithium formed in the reaction can simply be combined with the lithium of the solution and removed from the cell, as at 23 and returned to the lithium blanket.

The electrolyte 26 can include a material that is capable of conducting tritide ions. By way of example, the electrolyte 26 can be a hydride-containing salt mixture such as and without limitation, $CaH_2$—$CaBr_2$, $CaCl_2$—LiCl, $SrBr_2$—LiBr, $SrBr_2$—SrHBr, $CaBr_2$—CaHBr, $SrCl_2$—$CaCl_2$—LiCl—CaHCl, LiCl—CaHCl—$CaCl_2$, CaHBr—$CaBr_2$, and so forth.

The cell 20 can also include an electrode 28 that is separated from the electrode 24 by the electrolyte 26. Following conveyance of the tritide ion across the electrolyte 26, the tritide ion can be oxidized at the electrode 24 to form tritium gas according to the reaction:

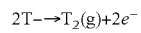
$$2T^- \rightarrow T_2(g) + 2e^-$$

Exemplary tritium-producing materials of the electrode 28 include, without limitation, a noble metal (ex., platinum), silver alloys (Silver-Copper, Silver-Tin, etc.), cermets, electronic oxides and composites thereof with stabilized zirconia. A cermet can be for example a composite of an oxygen stable noble metal such as iridium or platinum and a stabilized zirconia. The noble metal can be capable of withstanding the operating temperatures of the cell without melting. Stabilized zirconia may be a rare earth element- or alkaline earth-stabilized zirconia, such as zirconia stabilized with yttria, calcium oxide, scandium oxide and the like as discussed above. Other cermets as are known in the art may be utilized. For instance, a cermet including a sintered combination of iron and nickel oxides with copper and/or silver may be utilized.

In another embodiment, the electrode 28 can include an oxygen stable electronic oxide such as strontium-doped lanthanum manganite ($La_{1-x}Sr_xMnO_3$ (LSM)). Other stable electronic oxides as may be utilized include A-site deficient acceptor-doped lanthanum ferrite and lanthanum cobaltite, e.g., $La_{1-x}A_xFeO_3$ and/or $La_{1-x}A_xCoO_3$. The tritium producing materials may include one or more dopants from the group consisting of Ca, Co, Pr, Nd, and Gd, for instance in the La site and from the group consisting of Ni, Cr, Mg, Al, and Mn in the Fe or Co site; Fe may also be used as a dopant in the Co site.

In yet another embodiment, the tritium-producing material of the electrode 28 may be a composite material including an electronically conducting oxide and a stabilized zirconia.

The cell 20 can also include current collectors 12, 14, a voltage potential production and control device, outer lining, etc. as discussed previously for the embodiment of FIG. 1 and as known in the art.

The tritium produced at the electrode 28 can be removed from the cell as at 27. For instance, a carrier gas 29 such as helium or argon can be fed into the electrode 28 and the tritium gas that is formed in the electrode 28 that emerges at the interior surface of the electrode 28 can be entrained within the carrier gas flow and conveyed out of the cell 27.

Tritium recovered with the processes and systems as disclosed can be used in one embodiment as a fuel in a power plant employing the fusion of deuterium and tritium to produce helium and neutrons with a release of energy as known. Tritium also has application as a radioactive substitute for ordinary hydrogen or protium in biological or other tracer type studies as well as in lighting and defense applications as known in the art. Thus, the processes and systems can be utilized in conjunction with any neutron generating device including, without limitation, a nuclear reactor, a fusion device, an accelerator, etc. In addition, it should also be understood that an electrochemical cell as described herein can be used in conjunction with other electrochemical cells that are the same or different as the disclosed cells. For instance, a plurality of the disclosed cells can be utilized in parallel to increase throughput through the system. Cells can also be beneficially utilized in series as well as in a combination or parallel and series, depending upon the specific application and parameters of the system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for recovering tritium comprising:
   conveying a solution comprising lithium tritide in a molten lithium metal from a lithium blanket surrounding a core of a neutron generating device to an electrochemical cell, the electrochemical cell comprising a cathode and an electrolyte, the electrolyte being located so as to physically separate the cathode and the solution, the electrolyte being a lithium ion conducting electrolyte;
   thereafter, establishing a thermodynamic equilibrium voltage potential in the solution of from about 0.4V to about 1V, the thermodynamic equilibrium voltage potential dissociating the lithium tritide and forming lithium ions and tritium gas according to an ionization reaction;
   establishing a voltage potential across the electrolyte between the solution and the cathode, the lithium ions being conducted across the electrolyte to the cathode;
   reducing the lithium ions at the cathode to form lithium metal; and
   collecting the tritium gas.

2. The method of claim 1, wherein the neutron generating device is a nuclear reactor, a fusion device, or an accelerator.

3. The method of claim 1, further comprising returning the solution to the lithium blanket following the ionization of the lithium tritide.

4. The method of claim 1, wherein the electrolyte comprises a garnet-type lithium ion conducting electrolyte or a solid lithium ion conducting electrolyte.

5. The method of claim 1, wherein the electrochemical cell is utilized in parallel and/or in series with one or more additional electrochemical cells.

6. The method of claim 1, wherein the electrochemical cell is a component of a lithium buffer tank or reservoir.

7. The method of claim 1, further comprising reversing the voltage potential thereby oxidizing the lithium metal at the cathode and conducting the lithium ions thus formed across the electrolyte to the solution.

8. A method for recovering tritium comprising:
   conveying a solution comprising lithium tritide in a molten lithium metal to an electrochemical cell, the electrochemical cell comprising a first electrode, a second electrode, and an electrolyte, the electrolyte being located so as to physically separate the first electrode and the second electrode, the electrolyte being a tritide ion conducting electrolyte;
   establishing a voltage potential across the electrolyte between the first electrode and the second electrode, the voltage potential being sufficient to ionize the lithium tritide at the first electrode to form tritide ions and lithium according to an ionization reaction, the tritide ions thus formed being conducted across the electrolyte to the second electrode, the tritide ions being oxidized to form tritium gas at the second electrode; and
   collecting the tritium gas.

9. The method of claim 8, wherein the solution is conveyed from a lithium blanket surrounding the core of a neutron generating device.

10. The method of claim 8, the method further comprising returning the solution to the lithium blanket following the ionization of the lithium tritide.

11. The method of claim 8, further comprising holding the solution in a supporting container during the ionization reaction, the supporting container comprising the first electrode.

12. The method of claim 8, wherein the electrolyte comprises a hydride-containing salt mixture.

13. The method of claim 8, wherein the electrochemical cell is utilized in parallel and/or in series with one or more additional electrochemical cells.

14. An electrochemical cell for recovering tritium, the electrochemical cell comprising:
   an inlet in fluid communication with a lithium blanket surrounding a core of a neutron generating device;
   a supporting container in fluid communication with the inlet, the supporting container containing a solution comprising lithium tritide in a molten lithium metal anode;
   an electrode element, at least a portion of which being submersed within the molten lithium metal anode, the electrode element comprising a lithium ion conducting solid electrolyte and a cathode, the lithium ion conducting electrolyte being disposed between the molten lithium metal anode and the cathode.

15. The electrochemical cell of claim 14, wherein the supporting container is a lithium buffer tank or lithium reservoir.

16. The electrochemical cell of claim 14, wherein the electrolyte comprises a garnet-type lithium ion conducting electrolyte.

17. The electrochemical cell of claim 14, wherein the neutron generating device is a nuclear reactor, a fusion device, or an accelerator.

18. The electrochemical cell of claim 14, the supporting container further comprising an outlet in fluid communication with the lithium blanket.

* * * * *